United States Patent

Aurich et al.

[11] Patent Number: 5,161,646
[45] Date of Patent: Nov. 10, 1992

[54] ANIMAL ATTRACTANT SCENT DISPENSING DEVICE

[75] Inventors: Charles C. Aurich, Athens; Arthur Ott, Greensboro, both of Ga.

[73] Assignee: Wellington Leisure Products, Madison, Ga.

[21] Appl. No.: 673,952

[22] Filed: Mar. 22, 1991

[51] Int. Cl.⁵ .............................................. B67D 3/00
[52] U.S. Cl. ................................... 222/187; 222/180; 222/146.5; 43/1; 392/395
[58] Field of Search ................... 222/146.5, 180, 187, 222/192; 43/1, 129; 392/395, 404, 405

[56] References Cited

U.S. PATENT DOCUMENTS

| | | | |
|---|---|---|---|
| 2,597,195 | 5/1952 | Smith | 392/395 X |
| 2,608,436 | 8/1952 | Baughman | 392/395 X |
| 3,046,192 | 7/1962 | Bilyeu | 167/48 |
| 3,366,775 | 1/1968 | Mycue | 219/272 |
| 3,431,393 | 3/1969 | Katsuda | 392/395 |
| 3,804,592 | 4/1974 | Garbe | 222/187 X |
| 4,523,717 | 6/1985 | Schwab | 239/58 |
| 4,771,563 | 9/1988 | Easley | 43/129 |
| 4,773,178 | 9/1988 | Marek | 43/1 |
| 4,937,431 | 6/1990 | Jameson et al. | 392/395 |

Primary Examiner—Gregory L. Huson
Attorney, Agent, or Firm—Kennedy & Kennedy

[57] ABSTRACT

A device (10) for dispensing animal attractant scents has a case (11) in which are housed a power source (B) and a bottle (25) containing a supply of liquid animal attractant scent. A wick (40) having a heat generating resistor (41) is mounted in the wick and coupled to the power source (B) to heat the animal attractant scent drawn near it by capillary action from the bottle causing it to vaporize rapidly and be dispensed into ambient air.

9 Claims, 2 Drawing Sheets

ANIMAL ATTRACTANT SCENT DISPENSING DEVICE

TECHNICAL FIELD

This invention relates to devices for dispensing animal attractant scents.

BACKGROUND OF THE INVENTION

It has long been known that animals are naturally drawn to certain natural scents such as the urine of the same species of animal. Hunters often use these scents to attract prey into their vicinity. Though these scents are typically in liquid form, they are used by hunters in different ways. One approach is to pour the liquid scent directly onto the ground surrounding the hunter. Another way is to pour the liquid onto trees which a horned animal, such as a buck deer, has scraped to mark his territory. This approach is described in U.S. Pat. No. 4,771,563. Alternatively, the liquid is contained in a bottle and allowed to vaporize into ambient air through an opening in the container.

It has also been found that by disbursing liquid scent through an absorbent pad the scent may be more rapidly vaporized into air as shown in U.S. Pat. No. 4,523,717. Once vaporized, the scent is dispersed by natural air currents. However, in cold weather vaporization is quite slow. Furthermore, in sub-freezing conditions the liquid scent may actually freeze and thereby render the product useless.

In view of this cold weather problem, devices have been designed to heat the container of liquid scent, as shown in U.S. Pat. Nos. 3,366,775 and 4,771,563, to increase the speed of vaporization. Heating the container and its contents however is inefficient and results in frequently having to replace the power source which typically is a battery or battery pack. Still other devices have been designed in which only the absorbent pad containing the liquid scent is heated, as shown in U.S. Pat. Nos. 3,046,192 and 4,773,178. Here, however, the liquid is so rapidly evaporated and depleted that its user finds himself constantly having to add additional liquid scent to the pad.

It thus is seen that a need remains for a device for dispensing animal attractant scents effectively and efficiently and which can be used in cold ambient conditions without the need for frequent replenishment of the liquid scent or the source of electric power. Accordingly, it is to the provision of such a device that the present invention is primarily directed.

SUMMARY OF THE INVENTION

In a preferred form of the invention, an animal attractant scent dispensing device comprises a container adapted to hold a supply of liquid animal attractant scent and a wick having one portion adapted to extend into the container and with another portion exposed to ambient air. The device also has an electric heating element mounted in thermal contact with the wick, an electric power source, and electric coupling means for coupling the heating element with the power source. With this construction, upon submerging the one wick portion in a supply of liquid animal scent contained within the container and coupling the heating element with the electric power source, liquid animal attractant scent may be drawn through the other wick portion, heated and rapidly vaporized and dispensed into ambient air.

DETAILED DESCRIPTION

Figure 1:
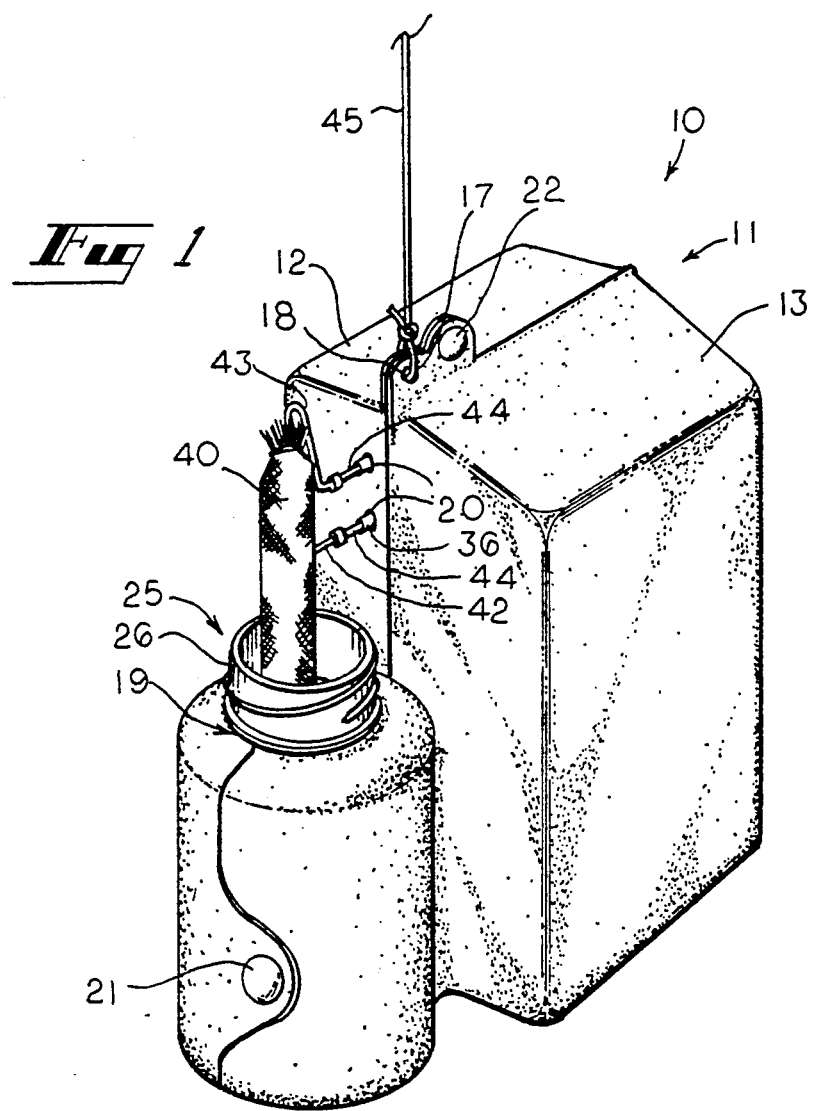
FIG. 1 is a perspective view of an animal attractant scent dispensing device embodying principles of the present invention in a preferred form.
Figure 2:
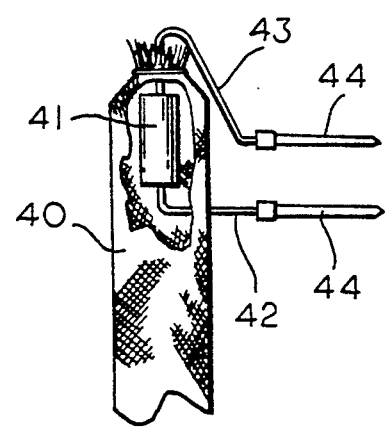
FIG. 2 is a side view, shown partly in cross section, of an upper portion of the device wick shown in FIG. 1.

With reference next to the drawings, there is shown an animal attractant scent dispensing device 10 having a soft, somewhat flexible case 11. The case 11 has a left section 12 and a right section 13 that are unitarily hinged together along a hinge 14. Each section forms part of a first chamber 15 and part of a second chamber 16 that mate when the case is closed to form the complete first and second case chambers. The case has a large upper opening 19 providing access to the first chamber 15. The case also has a pair of small side holes 20 communicating with the left section second chamber 16. Each case section has a lug 17 formed with an eyelet 18. The case is also provided with a snap 21 located distally from the hinge 14 and a snap 22 located adjacent each lug 17.

A bottle 25, having a threaded neck 26, is mounted within the case first chamber 15 with its neck extending through the case opening 19. A cap 27 is threaded onto the bottle neck 26 outside of the opening 19. A battery mounting box 30, having a positive contact 31 and a negative spring contact 32, is mounted within the case second chamber 16. Mounted within the battery mounting box 30 is a conventional 1.5 VDC dry cell battery B in engagement with the contacts 31 and 32. A positive lead wire 33 is mounted to the positive contact 31 and a negative lead wire 34 is mounted to the negative contact 32. The other ends of the lead wires 33 and 34 are mounted to two electrical connector sockets 36 that are mounted to a retaining plate 37 which in turn is mounted to the box 30. The connector sockets 36 extend completely through the case holes 20 so as to be readily accessible from outside the case.

The dispensing device 10 also has a cloth wick 40 of a sock-like or tubular configuration. A heat generating electrical resistor 41 is mounted within an upper portion of the wick. The resistor 41, which preferably is a one ohm, 3-watt resistor, has relatively stiff, though bendable, lead wires 42 and 43 which extend through the cloth wick 40. Two connector pins 44 are mounted to the ends of the lead wires 42 and 43. These pins are sized and aligned so as to be insertable into the two connector sockets 36 with the wick extending out of the bottle 25 as shown in FIG. 1. Finally, the dispensing device 10 has a length of cord 45, sized to pass through eyelets 18, the cord being shown stowed in the case second chamber 16 in FIG. 3.

Figure 3:
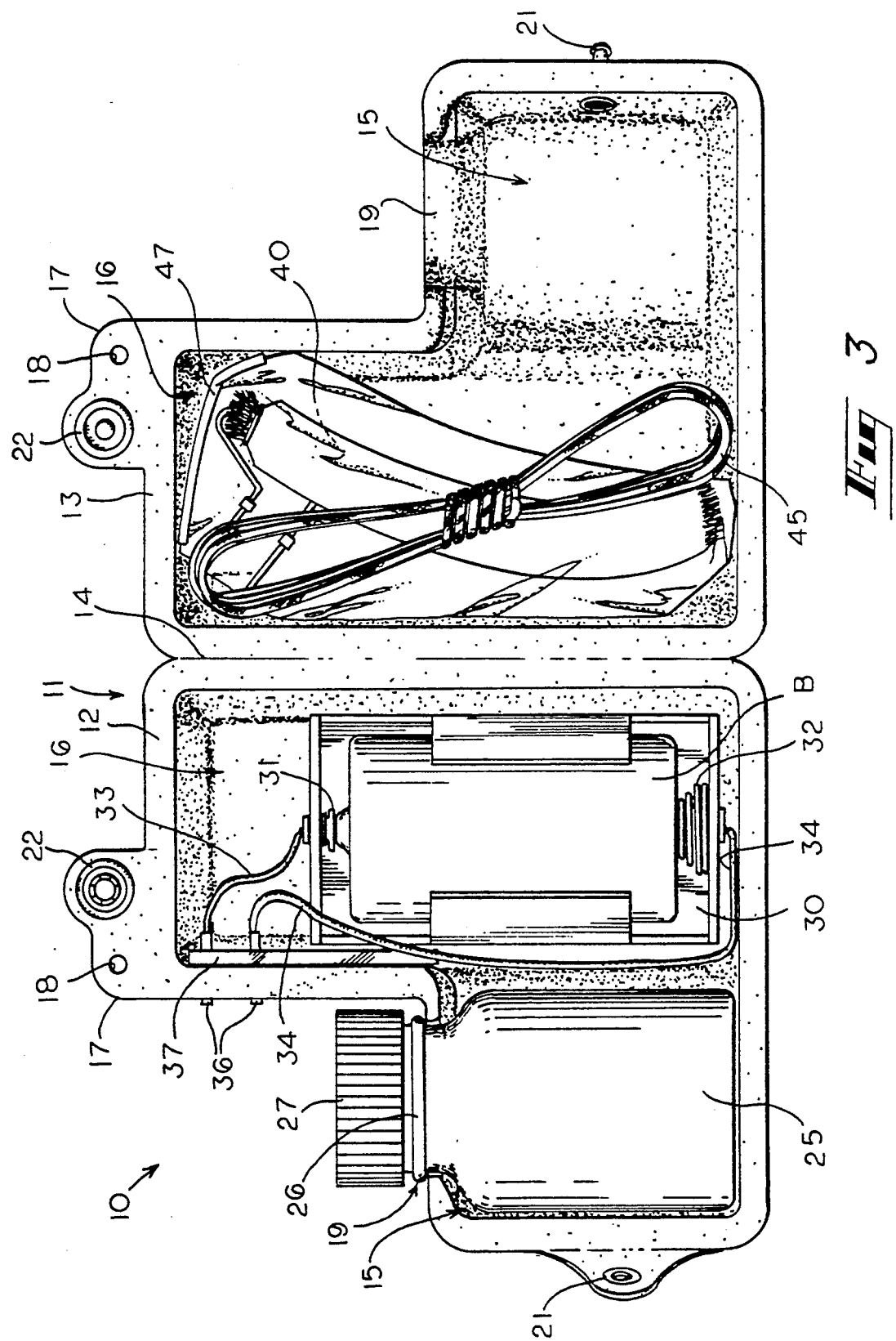
FIG. 3 is a side elevational view of the animal attractant scent dispensing device of FIG. 1 shown with its case opened revealing internally housed components.

In a storage or transport configuration, a battery B is mounted within the battery mounting box 30 and a supply of liquid animal attractant scent, such as natural doe urine, is contained within the bottle 25. Preferably, the wick is stored in a water-tight protective bag 47 to prevent residual liquid scent present from previous operations from soiling the case. The wick and bag are stowed with the cord 45 within the case right section second chamber 16, as shown in FIG. 3.

In preparing the device for use, a hunter releases the snaps 21 and 22, swings open the case along hinge 14, removes the wick 40 and cord 45, and then recloses the case. The bottle cap 27 is then removed and a lower portion of the wick submerged in the liquid scent. The connector pins 44 are inserted into the sockets 36 which serves to hold the upper portion of the wick above the bottle as shown in FIG. 3 in addition to coupling the resistor 41 with the battery B. The dispensing device may by suspended from an object, such as a tree branch, by simply passing the cord 45 through the eyelets 18, and tying one end. The opposite end may then be tied to the supporting object. In this manner the cord may serve the duel roll of both holding the case closed, as a back-up to the snap, and of suspending it from an overhead support. Alternatively, the cord may be loosely tied to the device so that the device may be opened while suspended. The dispensing device may also as an alternative be placed directly on the ground to dispense scent at ground level.

With the resistor lead connector pins 44 inserted into connector sockets 36, the resistor 41 is coupled with the battery B and heats the upper, emerged portion of the wick 40 through which liquid scent is drawn by capillary action. The heated liquid scent rapidly volatilizes and becomes dispensed into ambient air from the exposed wick.

From the foregoing, it is seen that a device for dispensing animal attractant scents is now provided which overcomes problems long associated with those of the prior art. It should however be understood that the just described embodiment merely illustrates principles of the invention in a preferred form. Many modifications, additions and deletions may, of course, be made thereto without departure from the spirit and scope of the invention as set forth in the following claims.

We claim:

1. An animal attractant scent dispensing device comprising a container adapted to hold a supply of liquid animal attractant scent, a wick having one portion adapted to extend into said container with another portion exposed to ambient air, an electric heating element mounted in thermal contact with said wick, an electric power source, electric coupling means for coupling said heating element with said power source, a case which comprises two sections hinged together for movement between an open and closed position, and when closed having one chamber in which at least a portion of said container is encased and another chamber in which said power source and a portion of said electric coupling means are encased, and wherein another portion of said electric coupling means is supported by said other chamber above said container and said wick depends from said other portion of said electric coupling means into said container, whereby upon submerging the one wick portion is a supply of liquid animal scent contained within the container and coupling the heating element with the electric power source liquid animal attractant scent may be drawn through the other wick portion, heated and rapidly dispensed into ambient air.

2. The animal attractant scent dispensing device of claim 1 wherein said heating element is mounted to said other wick portion.

3. The animal attractant scent dispensing device of claim 2 wherein said heating element is mounted within said other wick portion.

4. The animal attractant scent dispensing device of claim 1 wherein said case has eyelets, and said device further comprises a length of cord sized to pass through said eyelets for retaining the openable case in a closed position and suspending said case from an object to which said cord is fixed.

5. The animal attractant scent dispensing device of claim 1 wherein said electric coupling means includes connector means mounted to said case for releasably connecting said electric heating element to said electric power source.

6. The animal attractant scent dispensing device of claim 5 wherein said electric coupling means includes stiff yet bendable leads coupled to said electric heating element, and wherein said connector means comprises a pair of sockets mounted to said case and a pair of pins mounted to said stiff leads in alignment for insertion into said pair of sockets.

7. An animal attractant scent dispensing device comprising a container having an opening in an upper portion thereof and in which a supply of liquid animal attractant scent is contained; a wick having one portion submerged in said liquid and another portion extended through said container opening to ambient air; an electric heating element mounted to said wick; an electric power supply; electric coupling means for coupling said heating element with said power supply; and a case which comprises two sections hinged together for movement between an open and closed position, and when closed having one chamber in which at least a portion of said container is encased and another chamber in which said power supply and a portion of said coupling means are encased, and wherein another portion of said coupling means extends from said other case chamber to said other wick portion.

8. The animal attractant scent dispensing device of claim 7 wherein said heating element is mounted within said other wick portion.

9. An animal attractant scent dispensing device comprising a case which has two sections hinged together for movement between an open and closed position, and when closed said case having first and second chambers with said first chamber having an opening to ambience; a bottle housed in said first chamber and having a neck extending through said first chamber opening; a supply of liquid animal attractant scent contained in said bottle; an electric power supply having electric coupling means mounted to said case; a wick having one portion submerged in said liquid and another portion emerged and extending through said bottle neck exposed to ambient air; and an electric heating element coupled with said electric coupling means mounted in thermal contact with said other wick portion, said electric heating element including leads sufficiently stiff for supporting said other wick portion, said leads being supported by and extending from said case second chamber.

* * * * *